Nov. 19, 1940.   W. E. HUMBERT   2,221,935
PLOW LIFT
Filed Dec. 12, 1938   2 Sheets-Sheet 1

Wilbur E. Humbert, INVENTOR
BY Victor J. Evans & Co.
ATTORNEYS

Nov. 19, 1940.　　W. E. HUMBERT　　2,221,935
PLOW LIFT
Filed Dec. 12, 1938　　2 Sheets-Sheet 2
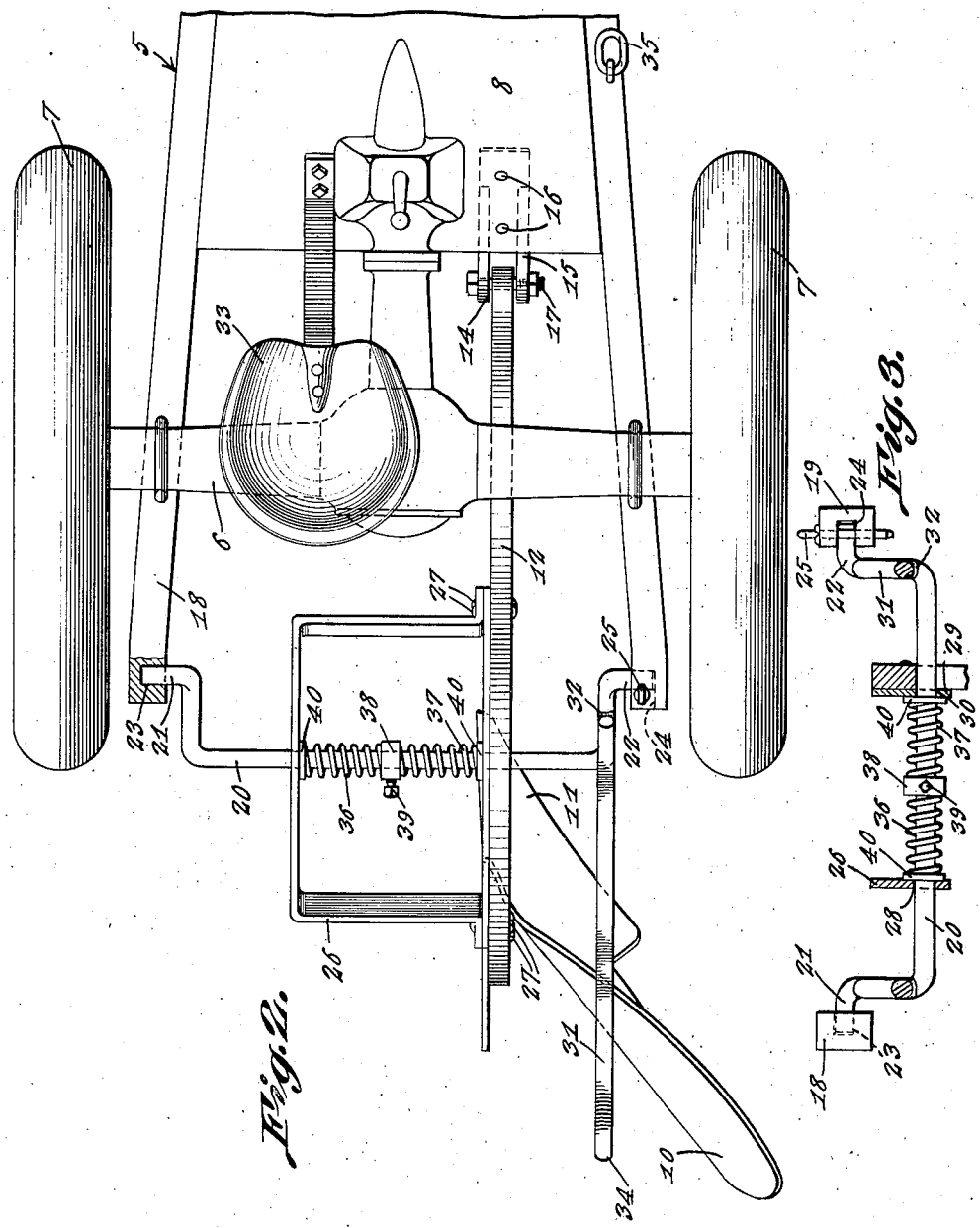
Wilbur E. Humbert, INVENTOR
BY Victor J. Evans & Co.
ATTORNEYS Patented Nov. 19, 1940

2,221,935

UNITED STATES PATENT OFFICE 2,221,935

PLOW LIFT

Wilbur E. Humbert, Eastside, Oreg., assignor of one-half to Ralph Humbert

Application December 12, 1938, Serial No. 245,319

1 Claim. (Cl. 97—47)

The present invention relates to a plow attaching device for wheeled vehicles and is primarily adapted for use with tractors.

The primary object of the invention resides in the provision of a means for permitting vertical movement of a plow that is readily attachable and detachable to the tractor.

A further object of the invention is to provide a means of attaching a plow to a tractor whereby it can be easily and readily raised between furrows and when released drops into plowing position.

Another object of the invention resides in the provision of means to permit sidewise movement of the detachable plow thus enabling the tractor to change its direction of travel while plowing.

A still further object of the invention resides in the provision of a plow that is detachable from the tractor though rigidly supported thereto, thereby minimizing the hazard of the tractor turning over.

The invention will be fully and comprehensively understood from a consideration of the following detailed description when read in connection with the accompanying drawings which form a part of the application.

In the drawings:

Figure 2 is a top plan view of the device illustrated in Figure 1; and

Figure 3 is a vertical sectional view taken substantially on line 3—3 of Figure 1.

Figure 1:
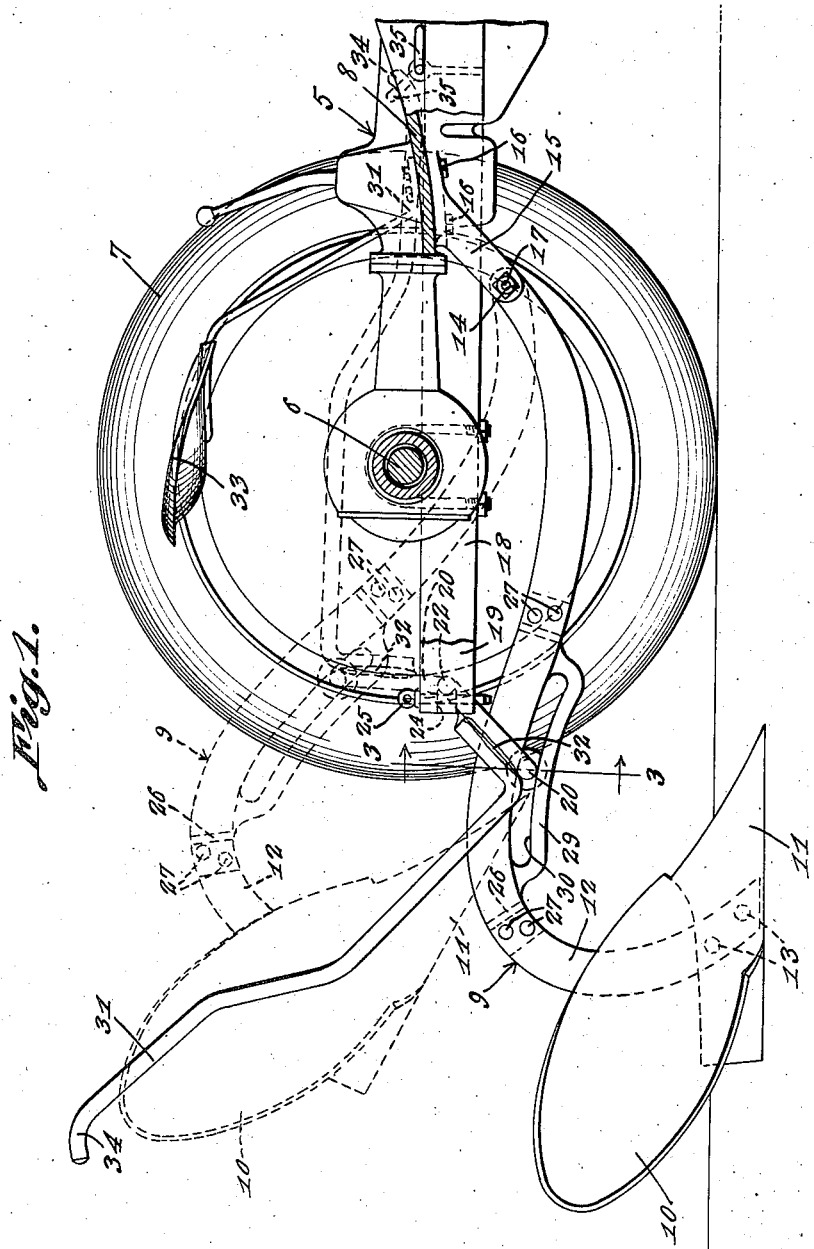
Figure 1 is a transverse sectional view illustrating a portion of a tractor with the plow and its associated parts illustrated in elevation.

The herein described invention is illustrated in connection with a tractor with which it is preferably used, but it is to be understood that it may be employed as an attachment for various kinds of wheeled vehicles. As illustrated in the drawings, a portion of a tractor is indicated generally by the numeral 5 including the rear axle 6, driving wheels 7 and a portion of a floor board 8. The plow attachment generally indicated at 9 is positioned beneath the driving axle 6 and has the front end thereof pivotally attached to the floor board 8. The plow attachment includes the mold board 10 and the plow share 11. The longitudinally extending beam 12 is riveted or otherwise secured at 13 on one end to the plow share and the opposite end pivotally connected at 14 to the link 15, said link being fixedly secured beneath the floor board 8 by bolts or other fastening means 16. It will be noted that the link 15 comprises a pair of arms through which the bolt and nut 17 extend for pivotally attaching the beam 12 thereto. Referring to Figure 1 of the drawings, it will be noted that the beam 12 is arcuately curved for positioning beneath the axle 6 and for attaching its ends to the plow share and link, respectively. When attaching the device to the tractor through the medium of the link 15, it is preferred that it be so arranged that when one wheel of the tractor is in the furrow it acts as a gauge for the depth of the plow.

The rearwardly extending arms 18 and 19 are illustrated as forming a part of the tractor and said arms are adapted to support the means for raising and lowering the plow. It is to be understood, however, that the plow raising means may be attached to a pair of similar arms which are fastened to the rear axle housing of any tractor.

The plow raising and lowering means includes a crank shaft 20 having its outwardly turned ends 21 and 22 journaled in the ends of the rearwardly extending arms 18 and 19, respectively. A socket 23 is formed in the arm 18 for receiving the end 21 and an outwardly opening socket 24 is formed in the end of the arm 19 in which socket is positioned a pin 25 for removably retaining said end therein. When assembling the device the end 21 is first positioned within the socket 23 and the opposite end 22 is then slidably disposed within the socket 24. The pin 25 will then be dropped in place thus locking the end 24 in position.

A U-shaped frame 26 is bolted or otherwise secured as indicated at 27 to the inner side wall of the beam 12, said frame being arcuately shaped and having formed therein an arcuate slot 28 through which the crank shaft is positioned for attaching said crank shaft to the beam 12. The beam 12 has an off-set portion 29 which has formed therein an arcuate slot 30, said slot being diametrically opposed from the slot 28 and the crank shaft which extends through both slots will rest therein so that movement of said crank shaft in a vertical direction will raise or lower the plow 10. The crank shaft and its association with the beam 12 and arcuately formed U-shaped frame 26 will also serve to rigidly hold the plow in position relative to the tractor.

A lever 31 is welded or otherwise secured at 32 to the crank shaft 20 for actuating said crank shaft to raise and lower the plow. The lever 31 is curved as illustrated and projects upwardly so as to be within convenient reach of the operator seated on the seat 33. In Figure 1 of the drawings the plow, crank shaft and lever are illustrated in full lines for plowing position. The dotted line illustration indicates the plow in raised position and it will be noted that the lever 31 in that position is in substantially a horizontal position and can be held down by the driver's foot resting on the end 34. When releasing pressure from the end of the lever, the plow will drop into plowing position. However, when desiring to maintain the plow in raised position for an extended period of time, a ring 35 attached to the forward end of the arm 19 can be slipped over the end of said lever and firmly held thereby.

While the crank shaft and the associated mechanism carried by the beam 12 serves to rigidly hold the plow in position, it is desired to permit a sidewise movement of the plow thus enabling the tractor to readily change its direction of travel. The means for accomplishing this purpose includes a pair of coiled tension springs 36 and 37 which surround the portion of the crank shaft 20 which is disposed between the opposed slots 28 and 30. The inner ends of each spring engage the member 38 which is fixedly mounted on the crank shaft 20 by means of the adjusting screw 39. The outer ends of the springs engage suitable collars 40 mounted adjacent the respective slots. It will be readily seen that sidewise motion of the plow is permitted by either of the springs contacting a portion of the frame on one side and the member 38 on the other side. The member 38 will also limit the sidewise motion of the frame carrying the plow and which slides on the crank shaft 20.

From the above description, taken in connection with the illustrated drawings, it is believed that the operation of the device is readily obvious. The driver of the vehicle when desiring to lift the plow grasps the lever 31 and by exerting a forward motion thereon causes the crank shaft 20 to pivot on its respective ends 21 and 22 and to be moved to a substantially vertical position. Movement of the crank shaft raises the beam 12 and plow 10 as illustrated in phantom in Figure 1 of the drawings. The lever 31 can be held downwardly by the foot of the driver while changing furrows or moving the tractor over the area to be plowed. When plowing a new furrow pressure on the lever is released after one wheel of the tractor is in the plowed furrow thus dropping the plow into plowing position and properly gauged for depth of the new furrow.

When desiring to detach the plow from the tractor, the pin 25 is removed and the end 22 slipped out of position in the socket 24. The beam is then detached by removal of the nut and bolt 17 from the link 15 thus making it possible to completely remove the end 21 of the crank shaft 20 from its socket 23. The attachment is positioned on the tractor by reversing the procedure above mentioned. Attaching and detaching the device requires a minimum amount of time and effort thus adding to the simplicity of the device.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claim.

What is claimed is:

A device of the character described comprising, in combination, a tractor having rearwardly extending frame members, a plow having a beam attached thereto, a U-shaped frame attached to and extending from a side of the plow beam, said beam and U-shaped frame being formed with opposed slots, means for pivotally attaching the beam and U-shaped frame to said tractor, a crank shaft mounted in the ends of said rearwardly extending members and positioned in the opposed slots, and a coil spring surrounding the portion of said crank shaft disposed between the opposed slots, said springs permitting sidewise movement of the plow when changing the direction of travel of said tractor.

WILBUR E. HUMBERT.